April 23, 1929.
M. E. SEBRANSKI
1,709,919
CLOTHESLINE SUPPORT
Original Filed July 20, 1927
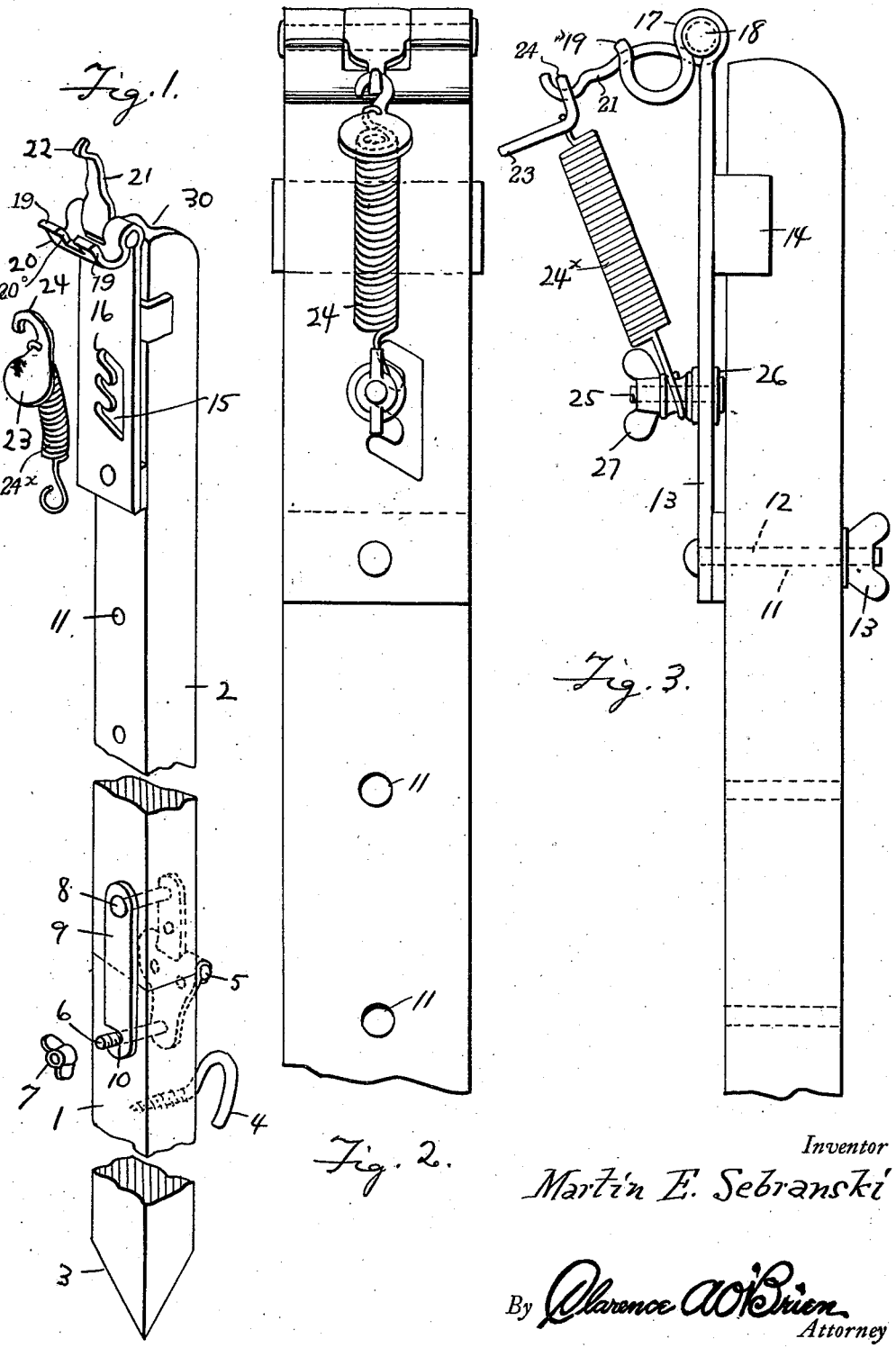
Inventor
*Martin E. Sebranski*
By *Clarence A. O'Brien*
Attorney Patented Apr. 23, 1929.

1,709,919

UNITED STATES PATENT OFFICE.

MARTIN E. SEBRANSKI, OF RACINE, WISCONSIN.

CLOTHESLINE SUPPORT.

Application filed July 20, 1927, Serial No. 207,292. Renewed October 15, 1928.

My present invention has to do with means for supporting clothes lines and the like; and it contemplates the provision of a clothes line support equipped with means whereby the line is secured to the support in such manner as to preclude disengagement of the line from the support.

Another object of the invention is the provision of a clothes line support adapted when not in use to be folded into a bundle of small compass so that it will be feasible to store the support in a dwelling house or other place with a view to protecting it against the elements and against becoming soiled.

Another object is the provision of a clothes line support in which the parts are so constructed and relatively arranged that the line may be secured and supported at various points in the height of the proportion of the support.

Other objects and practical advantages of the invention will be fully understood from the following description and claims when the same are read in connection with the drawings, accompanying and forming part of this specification, in which:—

Figure 1 is a broken perspective view of the clothes line support constituting the preferred embodiment of my invention with certain elements in disconnected relation, and the means for securing the lower end of the retractile spring omitted.

Figure 2 is an enlarged fragmentary elevation showing the rectractile spring and the securing means therefor in working relation.

Figure 3 is an enlarged elevation at right angles to Figure 2.

Similar numerals of reference designate corresponding parts in all the views of the drawings.

The prop of my improvement is preferably, though not necessarily, formed of wood in two sections 1 and 2, designed to be alined for use after the manner shown in Figure 1. The lower section 1 may be pointed as designated by 3 in order to penetrate the ground, or if preferred, the said lower section 1 may be provided at its lower end with a rubber or other suitable pad, not illustrated, designed to prevent slipping of the prop on a cement walk or other hard smooth surface. I would also have it understood that within the purview of my invention the lower section 1 may be and preferably is equipped with a hook 4 by which the prop may be supported and held on the upper edge of a fence or the like.

The sections 1 and 2 are hingedly connected as designated by 5, and the section 1 is provided with a projecting threaded bolt 6 to receive a wing nut 7 while the section 2 has pivotally connected to it at 8 a keeper 9 notched at 10 so as to engage the projecting bolt 6 after the manner illustrated in Figure 1. Manifestly with the keeper 9 in the position shown in Figure 1 and the wing nut 7 mounted on the bolt projection 6 so as to clamp and hold the keeper 9, the sections 1 and 2 will be strongly maintained in alined relation so as to constitute an efficient prop. Also, when the wing nut 7 is loosened on the bolt projection 6 and the keeper 9 is swung out of engagement with said bolt projection, the prop may be folded into a bundle of small compass for the convenient storage of the prop in a house or other building. At intervals of its length the prop section 2 is provided with apertures 11, and in one of said apertures 11 is removably arranged a headed bolt 12 equipped with a wing nut 13. The bolt 12 is for the connection of a body 13, preferably of metal, to the prop, and by placing of the bolt 12 in different apertures 11 it will be understood that the line may be engaged and maintained at various heights with respect to the prop. The body 13 is provided with a guide portion 14 adapted to straddle the prop, and the said body, which is preferably in the form of a plate as shown is provided at an intermediate point in its height with a major slot 15 in communication with a plurality of lateral sub-slots 16, Figures 1 and 2. At its upper end the plate-like body 13 is provided with tubular portions 17 for the reception of a pintle 18, and the said tubular portions 17 are merged into two line receiving hooks 19 separated by an intervening space 20 as shown in Figure 1 and also in Figure 2. The pintle 18 serves for the pivotal connection of a swingable tongue 21 which terminates in a hook 22 and is designed in the position shown in Figure 2 and also in Figure 3 to retain a clothes line or the like in the seat afforded by the arms or hooks 19. Detachably engaged with the hook 22 of the tongue 21 is a finger piece 23 having a hook arm 24, and connected at one end to the said finger piece 23 is a retractile spring 24$^x$, the purpose of which is to yieldingly hold the retaining tongue 21 in the working condition shown in Figure 3 for the retention of the line in the seat afforded by the arms 19. At its lower end, the spring 24ˣ is connected with a bolt 25, and the said bolt is provided with a circumferentially grooved portion 26 removably arranged in one of the sub-slots 16. I would also have it understood that the forward side of the circumferentially grooved portion 26 is formed by a washer backed by a wing nut 27 so that when the wing nut 27 is tightened on the bolt 25, the said bolt 25 will be detachably fixed to the body or plate 13.

Manifestly when the wing nut 27 is loosened, the bolt 25 may be removed from the sub-slot 16 indicated and may be placed in any other one of the sub-slots 16, according to the tension under which it is desired to place the retractile spring 24ˣ. The finger piece 23 serves merely to detach the retractile spring 24ˣ from the tongue 21 and it will be understood in this connection that subsequently to the disconnection of the spring 24ˣ from the arm or tongue 21, a clothes line may be expeditiously and easily placed laterally in or removed from the seat afforded by the hook-like arms 19.

When deemed expedient the upper end of the prop may be provided with a shallow notch as designated by 30, Figure 1, to seat a clothes line extending generally at right angles to the line disposed in the seat formed by the hook like arms 19.

It will be apparent from the foregoing that with a clothes line seated and secured in the body 13 in the manner described, there is no liability whatever of the line being casually released and permitted to fall with its burden of clothes to the ground. It will be appreciated, however, that the clothes line may be expeditiously and easily engaged with and as readily disengaged from my novel support.

I have entered into a detailed description of the construction and relative arrangement of the parts embraced in the present and preferred embodiment of my invention in order to impart a full, clear, and exact understanding of the said embodiment. I do not desire, however, to be understood as limiting myself to the precise construction and relative arrangement of parts as disclosed, my invention being defined by my appended claims within the scope of which modifications may be made without departure from my invention.

Having thus described the invention, what I claim as new and desire to secure by Letters Patent is:—

1. In a clothes line support, and in combination, a prop having apertures at intervals of its length, a bolt removably secured in one of the apertures, a body plate connected at one end to said bolt and having side portions intermediate its ends straddling and guided on the prop and also having near its other end tubular portions merging into spaced hook shaped arms adapted to form a seat for a clothes line, a pintle in said tubular portions, a swingable tongue pivotally connected at one end by said pintle and adapted to extend between the arms, said tongue terminating in a hook, a finger piece having a hook adapted to engage the hook of the tongue, and a retractile spring connected at one end with said finger piece and at its opposite end with the plate.

2. In a clothes line support, and in combination, a prop having apertures at intervals of its length, a bolt removably secured in one of the apertures, a body plate connected at one end to said bolt and having side portions intermediate its ends straddling and guided on the prop and also having near its other end tubular portions merging into spaced hook shaped arms adapted to form a seat for a clothes line, a pintle in said tubular portions, a swingable tongue pivotally connected at one end by said pintle and adapted to extend between the arms, said tongue terminating in a hook, a finger piece having a hook adapted to engage the hook of the tongue, a rectractile spring connected at its upper end with said finger piece and at its lower end with the plate, the plate being provided with a vertical slot, and a plurality of lateral slots in communication with the first named slot, the connection of the lower end of the spring with the plate being a detachable one, and means removably arranged in one of the lateral slots of the plate, and effecting said connection, whereby the tension of the spring may be regulated.

In testimony whereof I affix my signature.

MARTIN E. SEBRANSKI.